(12) United States Patent
Lee et al.

(10) Patent No.: US 6,735,391 B2
(45) Date of Patent: May 11, 2004

(54) AUTOMATIC RETRIEVAL OF WAVELENGTH-DIVISION MULTIPLEXED RING NETWORKS

(75) Inventors: Chang Hee Lee, Taejon (KR); Hyun Deok Kim, Daegu (KR); Jeong Hun Shin, Daegu (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 521 days.

(21) Appl. No.: 09/767,701

(22) Filed: Jan. 24, 2001

(65) Prior Publication Data

US 2001/0038472 A1 Nov. 8, 2001

(30) Foreign Application Priority Data

Oct. 4, 2000 (KR) .................... 10-2000-58295

(51) Int. Cl.[7] .................. H04B 10/00; H04B 10/08; H04J 14/00
(52) U.S. Cl. .................. 398/3; 398/5; 398/7; 398/9; 398/14; 398/17; 398/20; 398/72; 398/45
(58) Field of Search .................. 398/3, 5, 7, 9, 398/14, 17, 20, 72

(56) References Cited

U.S. PATENT DOCUMENTS 6,025,941 A * 2/2000 Srivastava et al. ............. 398/7
6,195,186 B1 * 2/2001 Asahi ............................ 398/5
6,414,771 B2 * 7/2002 Al-Salameh et al. .......... 398/48

OTHER PUBLICATIONS

"Fast revertible restoration scheme for dual–ring networks," Ko, K.W.; Lam, S.F.; Cheung, K.W.; Computers and Communications, 1997. Proceedings., Second IEEE Symposium on , Jul. 1–3, 1997, Page(s): 661–665.*

"Multiwavelength survivable ring network architectures," Elrefaie, A.; Communications, 1993. ICC 93. Geneva. Technical Program, Conference Record, IEEE International Conference on , vol.: 2, May 23–26, 1993, Page(s): 1245 –1251 vol. 2.*

"Fibre amplifiers in closed–ring WDM networks," Elrefaie, A.F.; Zaidi, S.; Electronics Letters , vol.: 28 Issue: 25, Dec. 3, 1992, Page(s): 2340–2341.*

"Unimpaired transmission through a bidirectional erbium-doped fiber amplifier near lasing threshold," M. Oskar van Deventer and Oscar J. Koning, IEEE Photon. Technol. Lett., vol. 7, pp. 1078–1080, Sept. 1995.*

* cited by examiner

Primary Examiner—Leslie Pascal
Assistant Examiner—Alex H Chan
(74) Attorney, Agent, or Firm—Bacon & Thomas, PLLC

(57) ABSTRACT

The present invention relates to an automatic retrieval method of a wavelength-division multiplexed (WDM) ring network to the normal state after recovery of a failure. More specifically, the present invention relates to an automatic retrieval method of a WDM ring network to the normal state after recovery of a failure by inducing a lasing by making the gain of the closed loop larger than 1 using the fact that the recovered section in the ring network forms a closed loop immediately after the recovery of the failure.

8 Claims, 12 Drawing Sheets

AUTOMATIC RETRIEVAL OF WAVELENGTH-DIVISION MULTIPLEXED RING NETWORKS

BACKGROUND OF THE INVENTION

1. Field of the Invention

The present invention relates to an automatic retrieval method of a wavelength-division multiplexed (WDM) ring network to the normal state after recovery of a failure. More specifically, the present invention relates to an automatic retrieval method of a WDM ring network to the normal state after recovery of a failure by inducing a lasing by making the gain of the closed loop larger than 1 using the fact that the recovered section in the ring network forms a closed loop immediately after the recovery of the failure.

2. Description of the Related Art

The development of wavelength-division multiplexing (WDM) technology and high speed electronic devices are enabling the era of ultra-high speed optical communication whose transmission capacity exceeds several Tb/s, and due to this extraordinary increase in the speed of communication networks, the importance of reliability in an optical communication network has newly been surfaced.

For example, a 400 Gb/s optical transmission system allows 5 million simultaneous calls through a pair of optical fibers; a communication failure of such system can cause chaos for a city or a nation as a whole.

Accordingly, it is very important to improve the reliability of a communication network along with the increase in the network capacity. In order to improve the reliability, a communication network should be equipped with a self-healing function.

Since a WDM communication network can transmit data or information without O/E or E/O conversion, it improves the transparency and reliability of the network as well as it can increase the transmission capacity.

There are several types of WDM networks that have self-healing capability. They are two-fiber unidirectional ring network, four-fiber bi-directional ring network, all-optical mesh network, and so forth.

A ring network is the simplest topology in which any pair of nodes has two separate paths between them. This makes a ring network flexible to failures. The WDM self-healing ring networks can provide consistent communication service through extra optical links by automatic restoration even if a failure occurs in the network.

FIG. 1 shows an example of four-fiber bi-directional WDM self-haeling ring network according to a prior art.

The network consists of four nodes 14a, 14b, 14c, 14d in total. Each of the nodes 14a, 14b, 14c, 14d is connected to working fiber links 10 and protection fiber links 12. Also, each of the nodes 14a, 14b, 14c, 14d is composed of an Add/Drop Multiplexer (ADM) for transmission (Add) and reception (Drop), space switches (SW), optical tap couplers (C) for monitoring of the state of the working fiber link 10, photodetectors (PD) for failure detection and control circuits (CC) for passing communication signals from the working fiber link 10 to the protection fiber link 12.

The working fiber link 10 is used when the network is in the normal state and the protection fiber link 12 is used when a failure occurs in the network.

If a failure such as a fiber cut occurs in the working fiber link 10, then a node switch (SW) adjacent to the failed fiber link 10 changes its state and detours the signal from the working fiber link 10 to the protection fiber link 12.

Previously, an automatic retrieval method using "bridge and switch method" after recovery of the failure is proposed (Tesuya Miyazaki and Shu Yamamoto, A proposal of the optical switch circuit architecture with bridge and switch function for WDM four-fiber ring network, Third OptoElectronics and Communication Conference (OECC 98) Technical Digest Series, paper 16A4-4, July, 1998). However, it has a complex structure and requires additional components such as switch, optical power splitter, photodetectors, and electrical control circuits. They bring additional signal loss. Also, it can be used only for the four-fiber bi-directional WDM self-healing ring network.

SUMMARY OF THE INVENTION

The present invention is designed to overcome the above problems of the prior art. The object of the invention is to provide an automatic retrieval method of a WDM ring network to the normal operation condition after recovery of a failure by using a lasing in a closed loop, which is made of a working fiber and a protection fiber between two adjacent nodes where the loop gain of the closed loop should be larger than unity.

In order to accomplish the above object, the present invention provides an automatic retrieval method of a WDM ring network to the normal operation condition after recovery of a failure that comprises; a detection step where the photodetectors in the nodes detect a failure that occurs during the normal operation state, a control step where the control circuit controls the space switches in the node adjacent to the failed fiber section, a recovery step where the signals which have been transmitted along the working path is bypassed along the protection fiber, a closed-loop formation step in which a closed loop is formed with the working fiber and the protection fiber, a lasing step in which a lasing arises by making the loop gain of the newly formed closed loop exceeds 1, a retrieval step where the transmission signal returns to the working fiber link by monitoring the optical power in the failed section.

Figure 12:
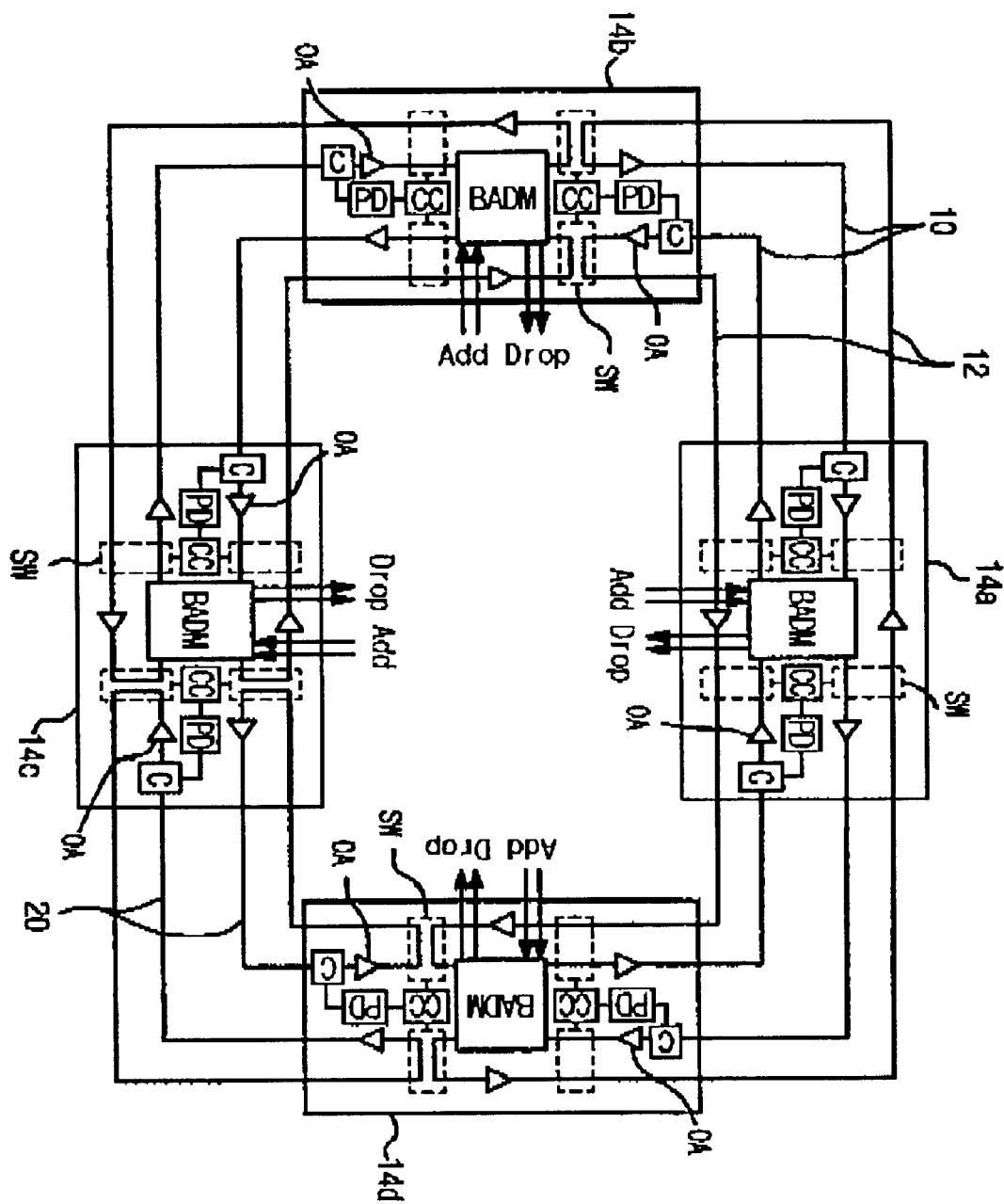
Figure 13:
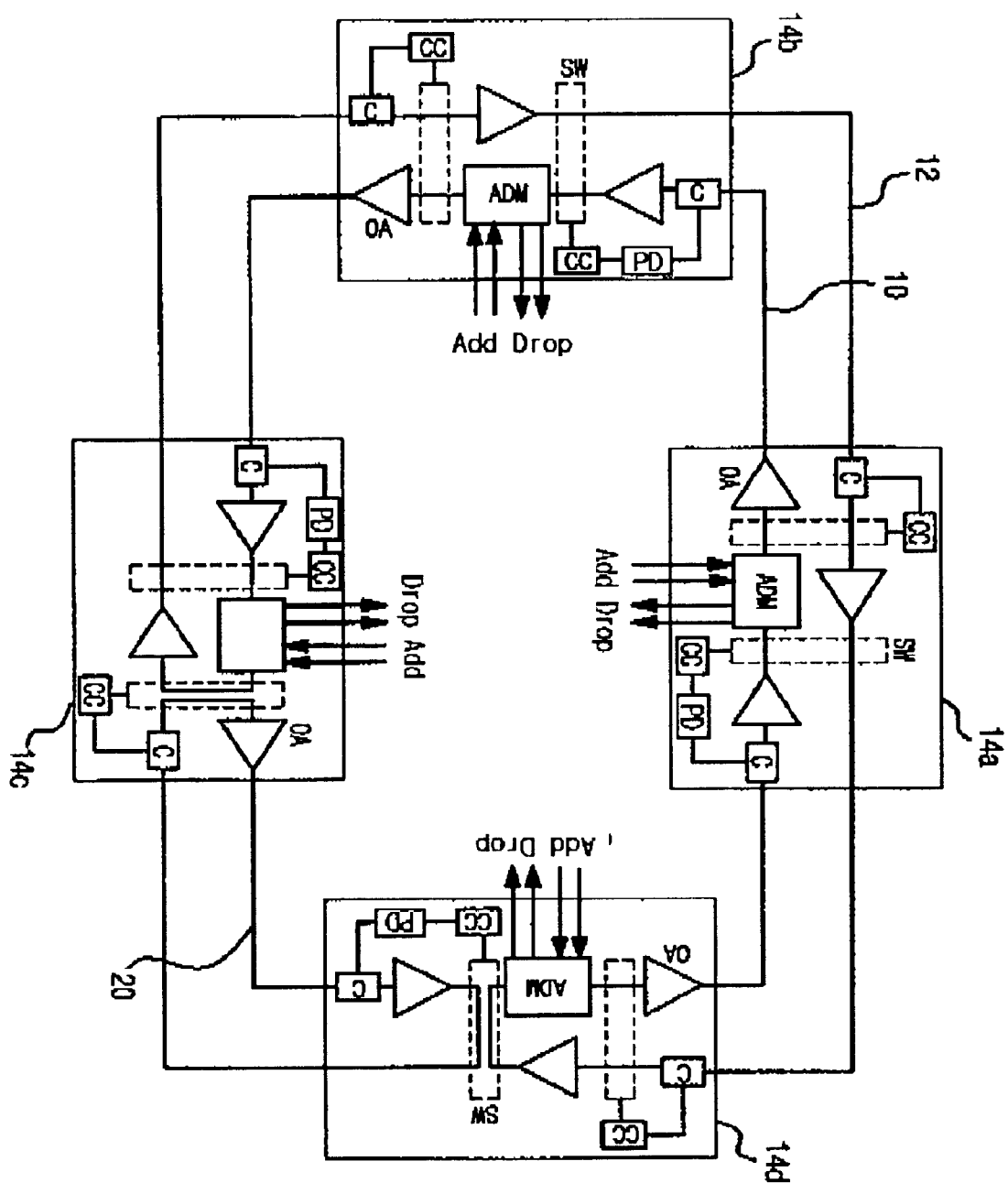
Figure 14:
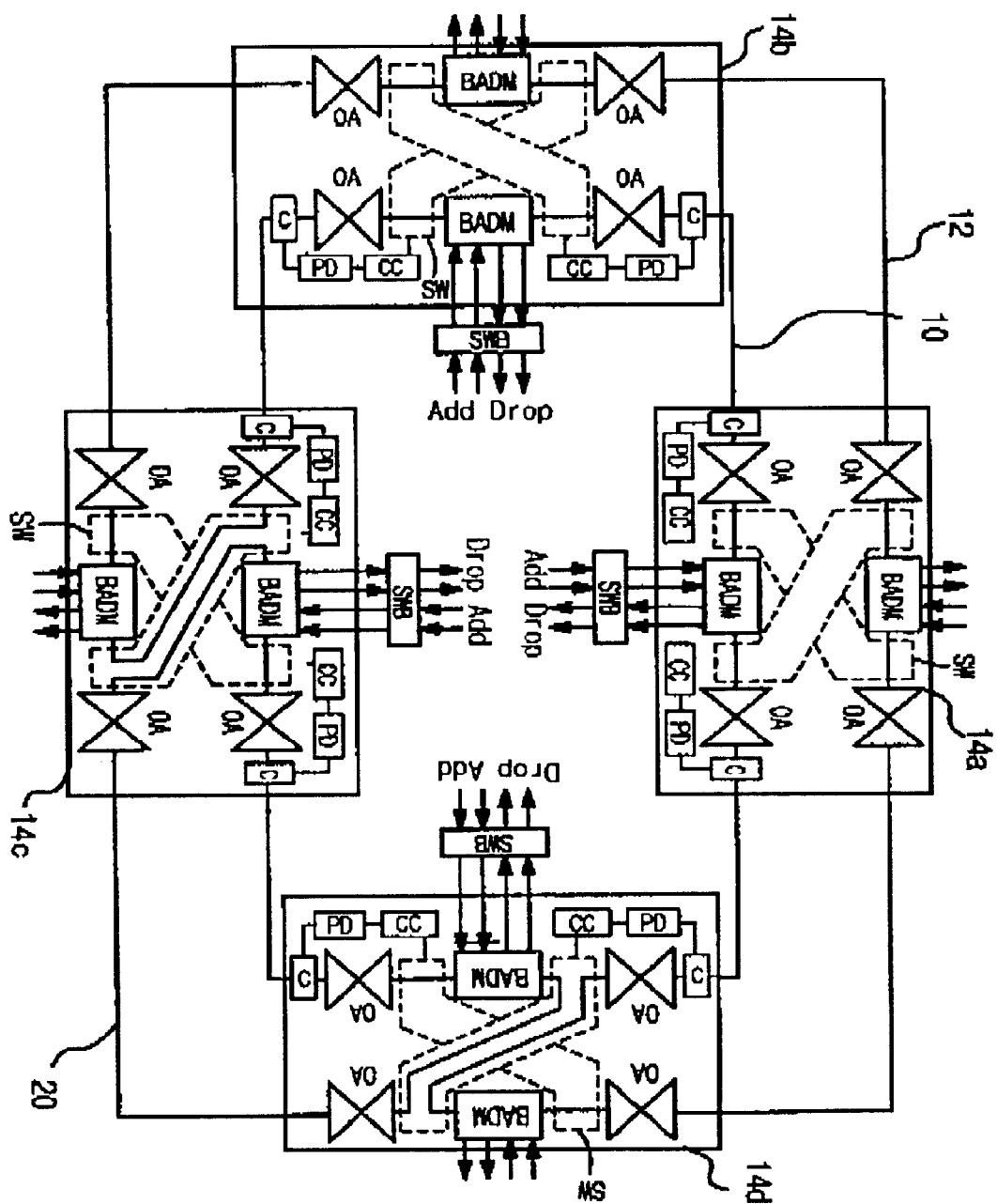

From FIG. 12 to FIG. 14 show variations of the network by changing the structure of the nodes according to the present invention.

DESCRIPTION OF THE NUMERIC ON THE MAIN PARTS OF THE DRAWINGS

10: working optical fiber links
12: protection optical fiber links
14a, 14b, 14c, 14d: Nodes
16: Multiplexer
18: Circulator
20: Closed Loop
ADM: Add/Drop Multiplexer
BADM: Bi-directional Add/Drop Multiplexer
C: Coupler
CC: Control Circuit
CH: Channel
OA: Optical Amplifier
SW: Switch
SWB: Switch Box

DETAILED DESCRIPTION OF THE EMBODIMENTS

Hereinafter, preferred embodiments of the present invention will be described in detail with reference to the accompanying drawings from FIG. 2 to FIG. 14.

According to the preferred embodiments of the present invention, a two-fiber bi-directional WDM self-healing ring network is used.

The basic configuration of the retrieval method according to the present invention comprises a detection step where the photodetectors in the nodes detect a failure that occurs during the normal operation state, a control step where the control circuit controls the space switches in the node adjacent to the failed fiber section, a recovery step where the signals which have been transmitted along the working path is bypassed along the protection fiber, a closed-loop formation step in which a closed loop is formed with the working fiber and the protection fiber, a lasing step in which a lasing arises by making the loop gain of the newly formed closed loop exceed 1, a retrieval step where the transmission signal returns to the working fiber link by monitoring the optical power in the failed section.

According to the present invention, a wavelength-interleaved bi-directional add/drop optical amplifier module with one Arrayed-Waveguide Grating (AWG) is used for the configuration of a two-fiber bi-directional WDM ring network in the present invention.

Each of the nodes from 14a to 14d is consisted of a Bi-directional Add/Drop Multiplexer (BADM), two switches (SW), three optical amplifiers in total (two in the working path 10, one in the protection path 12), optical couplers (C) which detects-detect failure in the working fiber link 10, 12, and control circuits (CC) which control the photodetectors (PD) and switches (SW).

According to the present invention, a 1:99 coupler is used for the coupler (C), a 2×2 mechanical switch is used for the switch (SW), and an Erbium-Doped Fiber Amplifier (EDFA) is used for the optical amplifier (OA).

Figure 1:
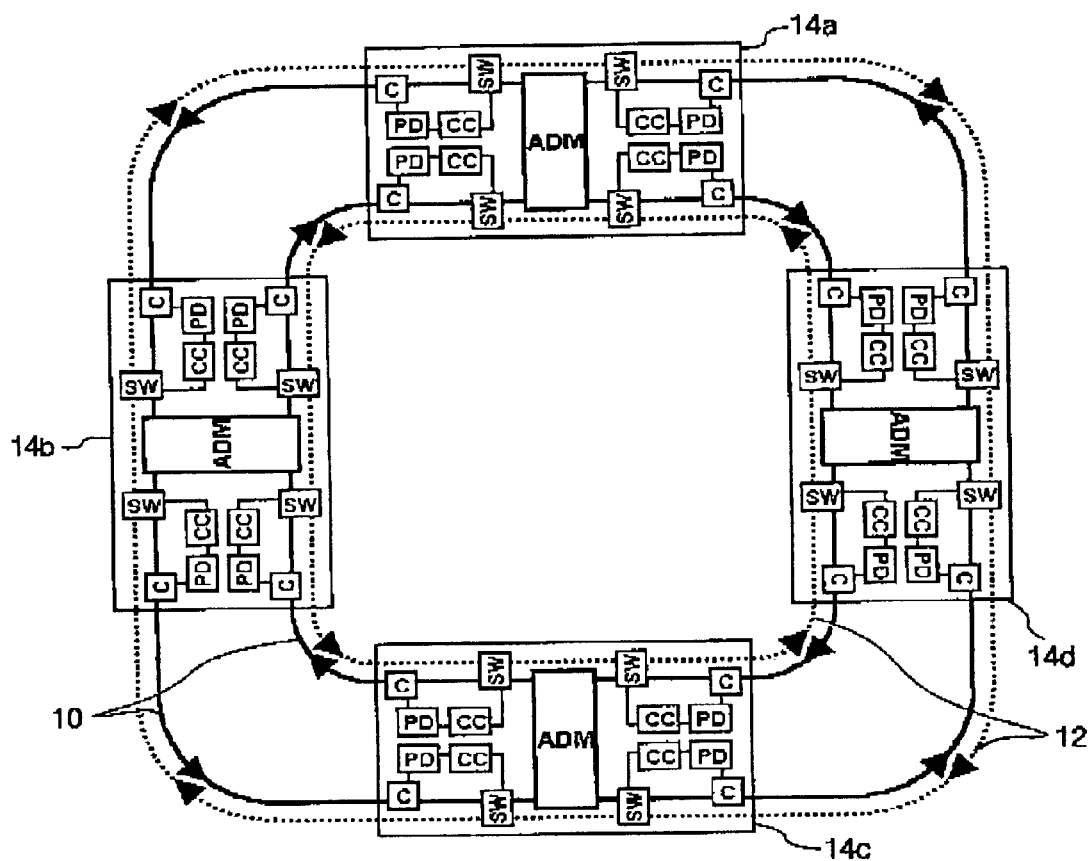
FIG. 1 shows an example of a conventional four-fiber WDM self-healing ring network according to a prior art.
Figure 2:
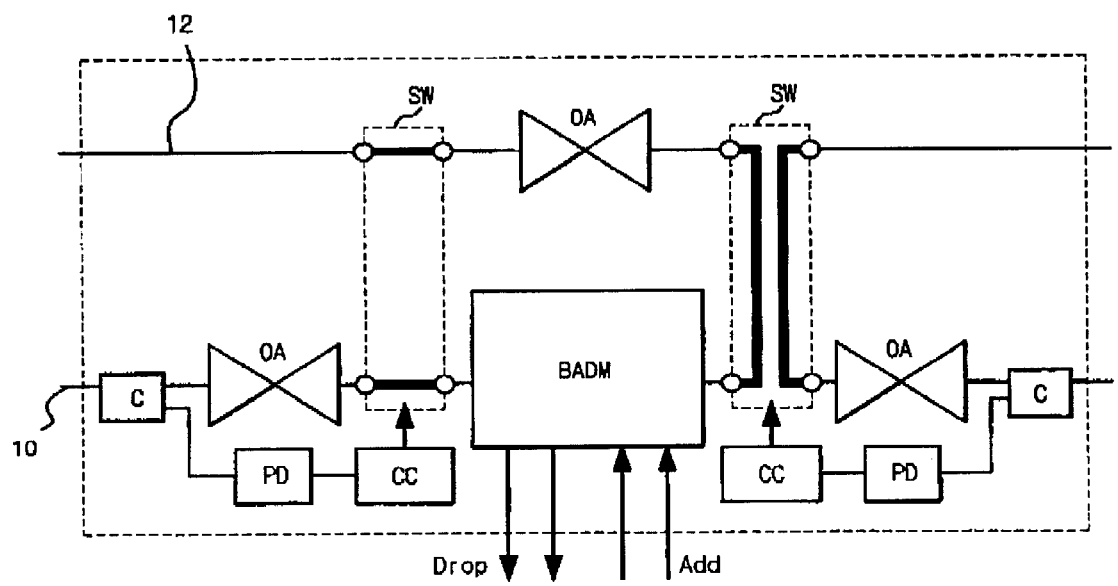
FIG. 2 shows structure of the node in the two-fiber bi-directional WDM self-healing ring network of the present invention.
Figure 3:
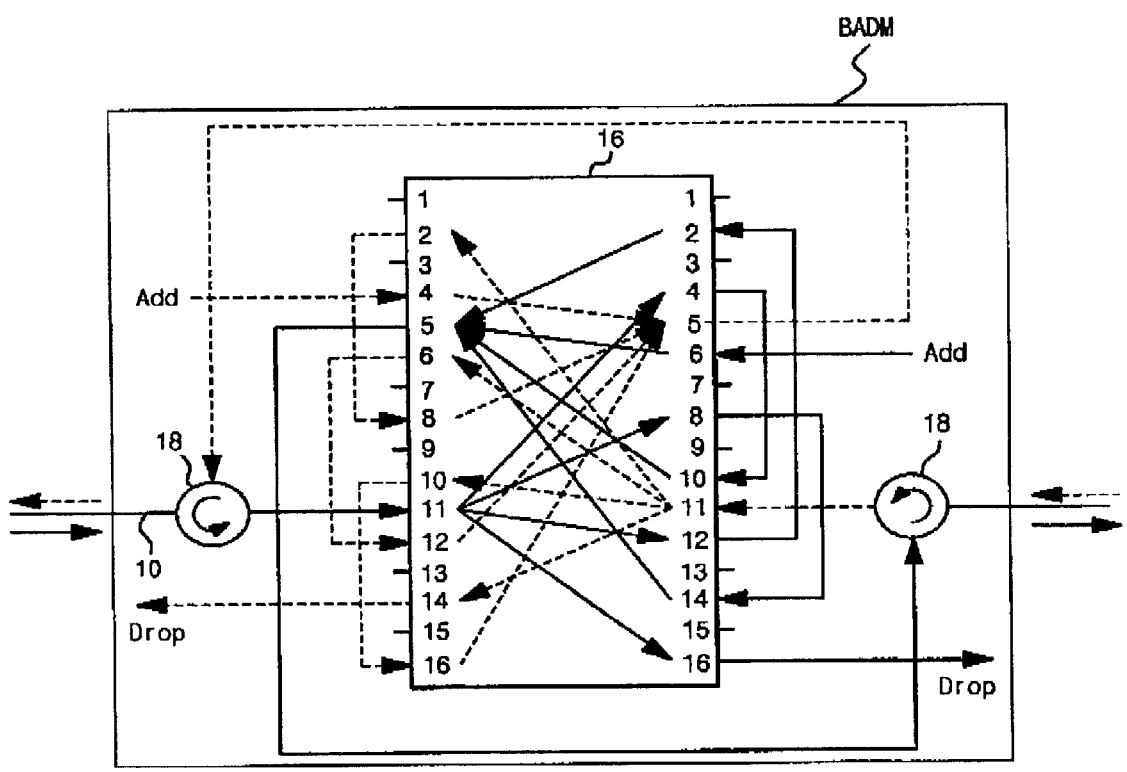
FIG. 3 is the structure of a Bi-directional Add/Drop Multiplexer (BADM) of the node in FIG. 2.

FIG. 3 is a detailed structure of a Bi-directional Add/Drop Multiplexer (BADM) in the nodes in FIG. 2 (from 14a to 14d). It is consisted of an N×N Multiplexer 16 and two circulators 18.

An N×N Arrayed-Waveguide Grating (AWG) is used for the Bi-directional Add/Drop Multiplexer (BADM), which has a fold-back configuration and can execute multiplexing (Add (Transmission)) and demultiplexing (Drop (Reception)).

The downstream signals in solid lines and the upstream signals in dotted lines are interleaved by the N×N multiplexer 16.

When a failure occurs in the working optical fiber link 10, it can be automatically restored in the optical domain dues to the configuration of the nodes (from 14a to 14d) as explained previously. More specifically, the couplers (C) and the photodetectors (PD) in the nodes 14a, 14b, 14c, 14d detect the signal power in the working fiber link 10 and the control circuits (CC) control the state of the switches (SW).

In FIG. 2, the switch (SW) on the left in the node shows that the working fiber link 10 on the left hand side of the node is in the working state. On the other hand, the switch (SW) on the right in the node shows that a failure has occurred on the right hand side of the node.

Figure 4:
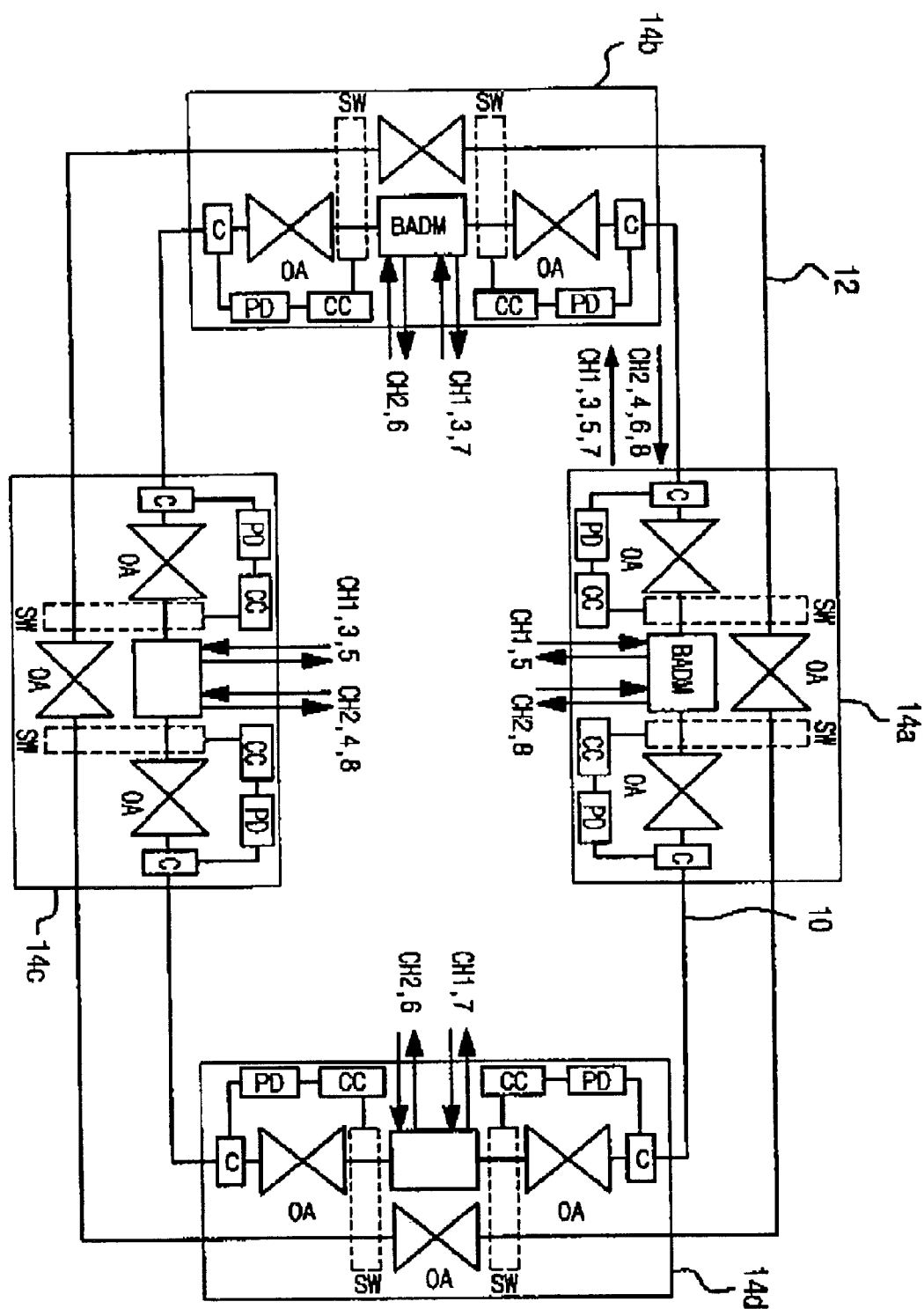
FIG. 4 is an example of the implementation diagram of the optical ring network according to the present invention.

In FIG. 4, the signals are transmitted along the working fiber links 10 in the normal state; the states of the switches are changed and the signals are transmitted along the protection fiber link 12 in the protection state.

Each of the nodes 14a, 14b, 14c, 14d in FIG. 4 add the signals for transmission and drop the signals for reception, and also has the pass-through function.

When a signal in a channel (CH) is dropped at a node, then another signal with the same wavelength with the dropped channel is added. The distance between two adjacent nodes 14a, 14b, 14c, 14d is 40 km.

In this instance, 8 channels are transmitted through the working fiber link 10, four of them are transmitted in the counterclockwise direction (CH1, CH3, CH5, CH7) and the other four are transmitted in the clockwise direction (CH2, CH4, CH6, CH8). Each signal from CH1 to CH8 has a wavelength of 1547.22 nm, 1549.32 nm, 1550.92 nm, 1552.52 nm, 1554.13 nm, 1555.75 nm, 1557.36 nm, 1558.98 nm respectively. The external modulator modulates the signals added at each of the nodes 14a, 14b, 14c, and 14d.

To evaluate the transmission performance, two channels (CH) are added at the node 3 (14c). The channel 3 (CH3) is added at the node 3 (14c) and transmitted in the counter-clockwise direction through the node 3 (14c), node 4 (14d), node 1 (14a), and node 2 (14b). Finally, it is dropped at the node 2 (14b) and its transmission length is 120 km in total. The channel 4 (CH4) is transmitted in the clockwise direction and its total transmission length is 160 km.

In this case, the channel 4 (CH4) which was added in the node 3 (14c) is transmitted through 8 optical amplifiers (OA) and 4 bi-directional Add/Drop Multiplexers (BADM).

Figure 5:
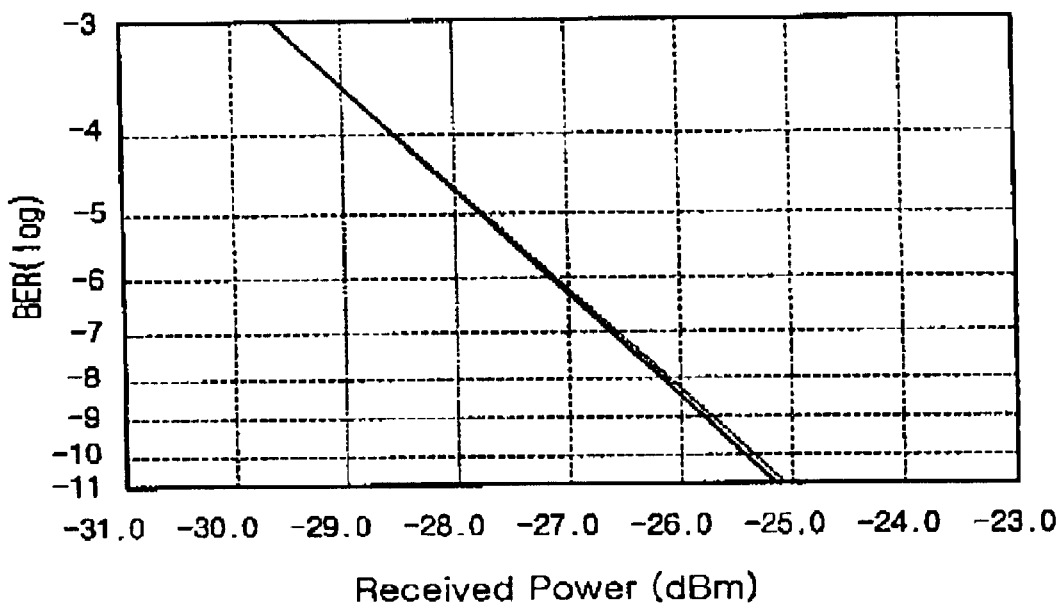
FIG. 5 and FIG. 6 show Bit-Error Rate (BER) curves for the working state and the protection state, respectively, in FIG. 4.
Figure 6:
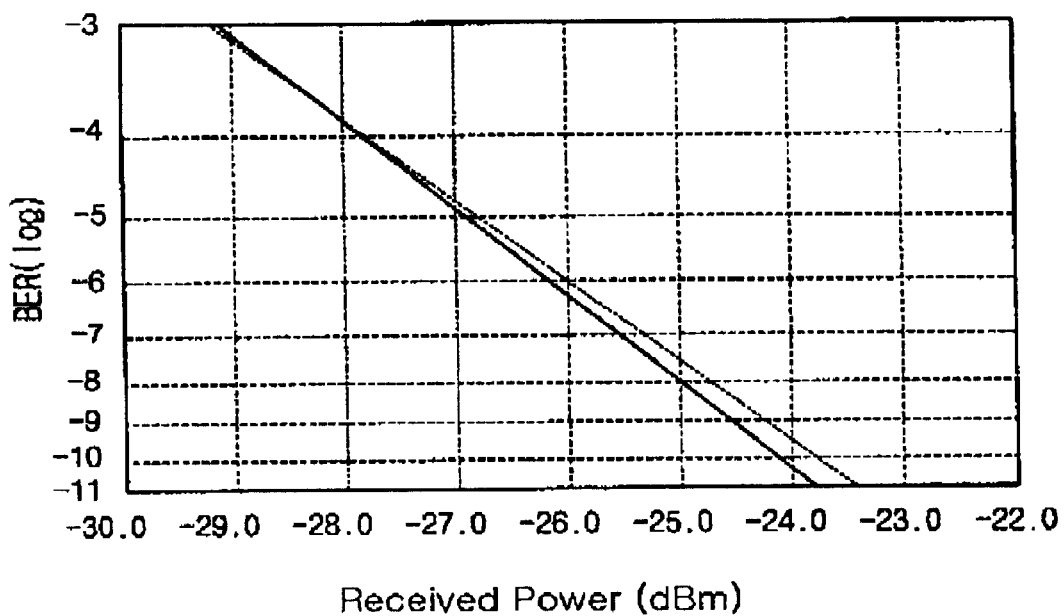
Figure 7:
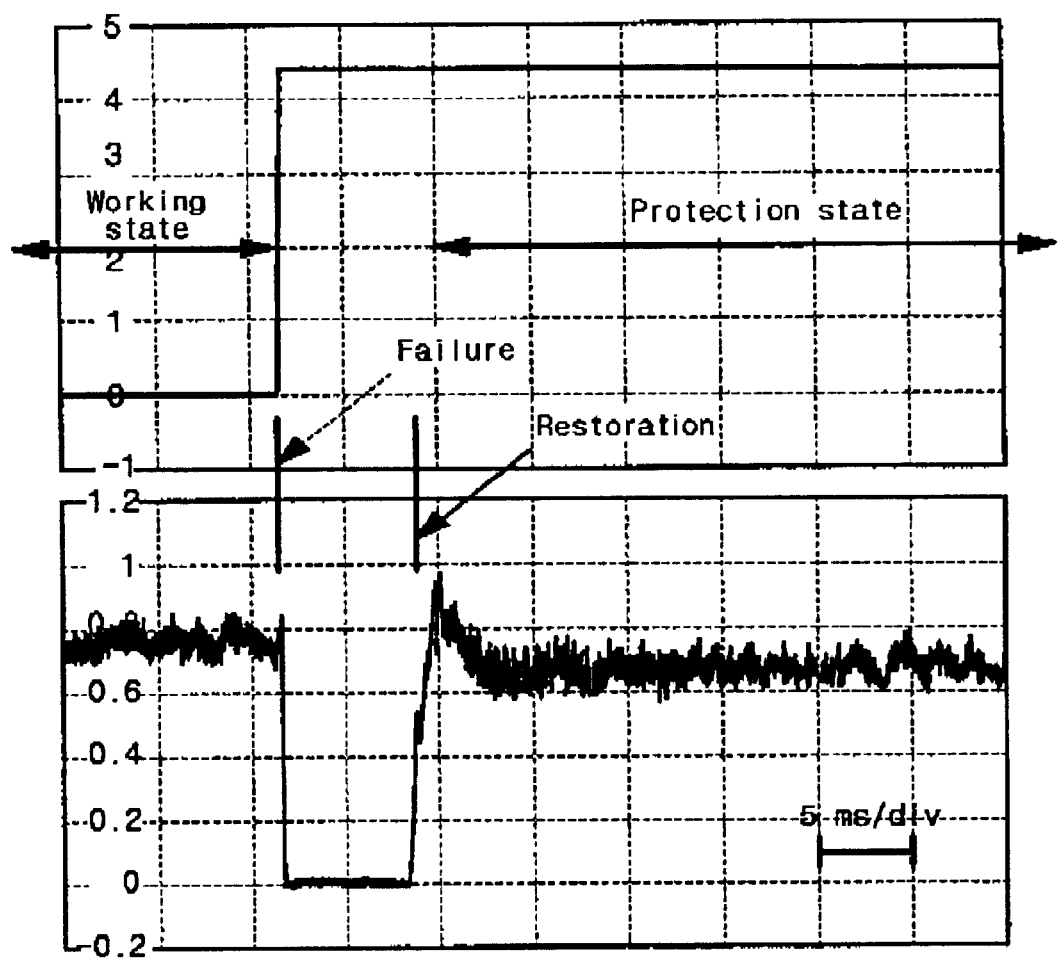
FIG. 7 shows a self-healing characteristic according to the present invention.

FIG. 5 and FIG. 6 show Bit-Error Rate (BER) curves of the signals transmitted in the counterclockwise direction and the clockwise direction respectively. The experiment shows that the power penalty of the transmitted signals is less than 0.5 dB at a Bit-Error Rate (BER) of $10^{-9}$. FIG. 7 shows a self-healing characteristic of the present invention in order to prove the self-healing capability by generating a failure between the node 3 (14c) and node 4 (14d).

In FIG. 7, the upper trace shows the state of the switch (SW) and the lower trace shows the intensity of the received signals into the node 3 (14c). In the upper trace, "LOW" state shows that the working fiber link 10 is in the normal state, and "HIGH" state shows that a failure has occurred in the working fiber link 10.

When a failure occurs in the working fiber link 10, the tap couplers (C) and the photodetectors (PD) in the node 3(14c)

detect the failure and the control circuit (CC) converts a switch (SW) facing the failed section.

At this instance, it is seen from the lower trace in FIG. 7 that the signal is received at the node 3 (14c) during the normal state but from the moment of failure no signal power is detected for a certain period of time before it receives the signal again.

It is because the switch (SW) needs some delay to convert its state—it is called a switching time of the switch. The experiment shows that the failure is restored within 10 ms.

Figure 8:
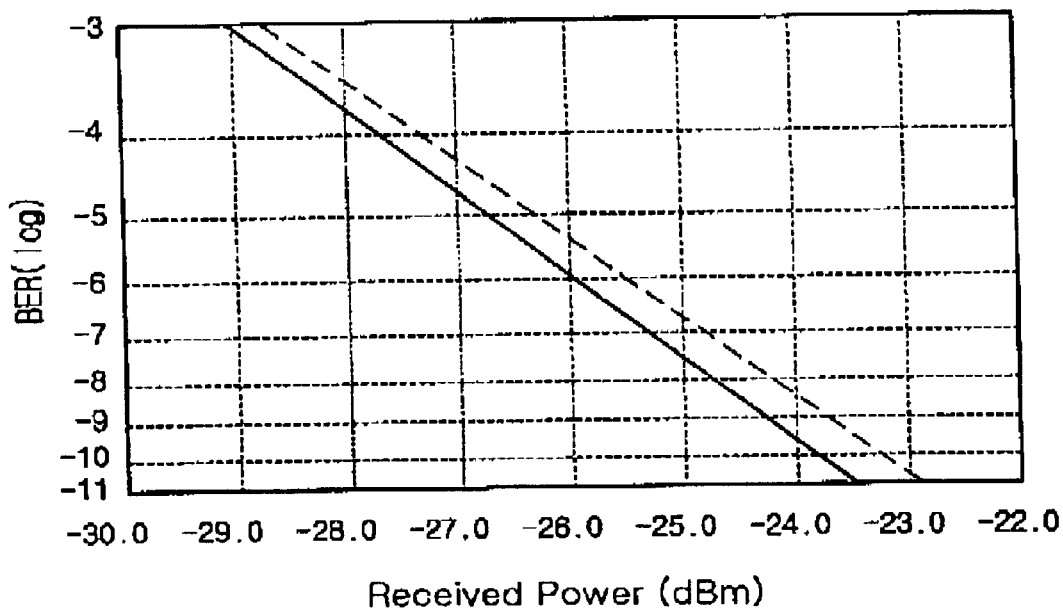
FIG. 8 and FIG. 9 represent Bit-Error Rate (BER) curves with respect to the transmission direction after the failure is recovered in FIG. 4.
Figure 9:
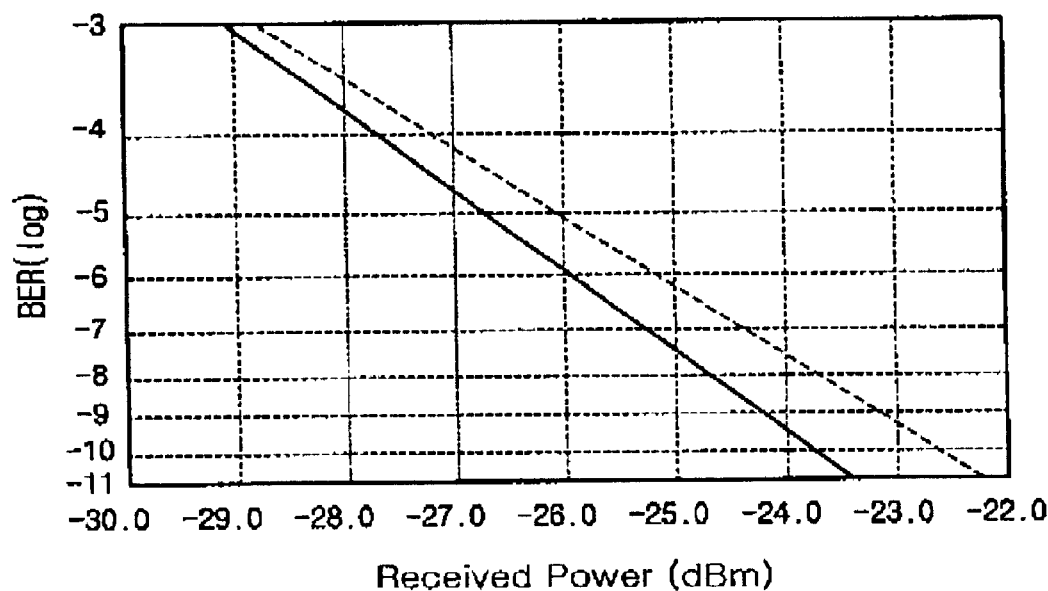

A similar process takes place at the node 4 (14d). FIG. 8 and FIG. 9 show Bit-Error Rate (BER) curves for the signals transmitted in the counterclockwise and in the clockwise directions respectively after the failure is restored. The experiment shows that the maximum power penalty of the restored signals is less than 1.1 dB at a Bit-Error Rate (BER) of $10^{-9}$.

Figure 10:
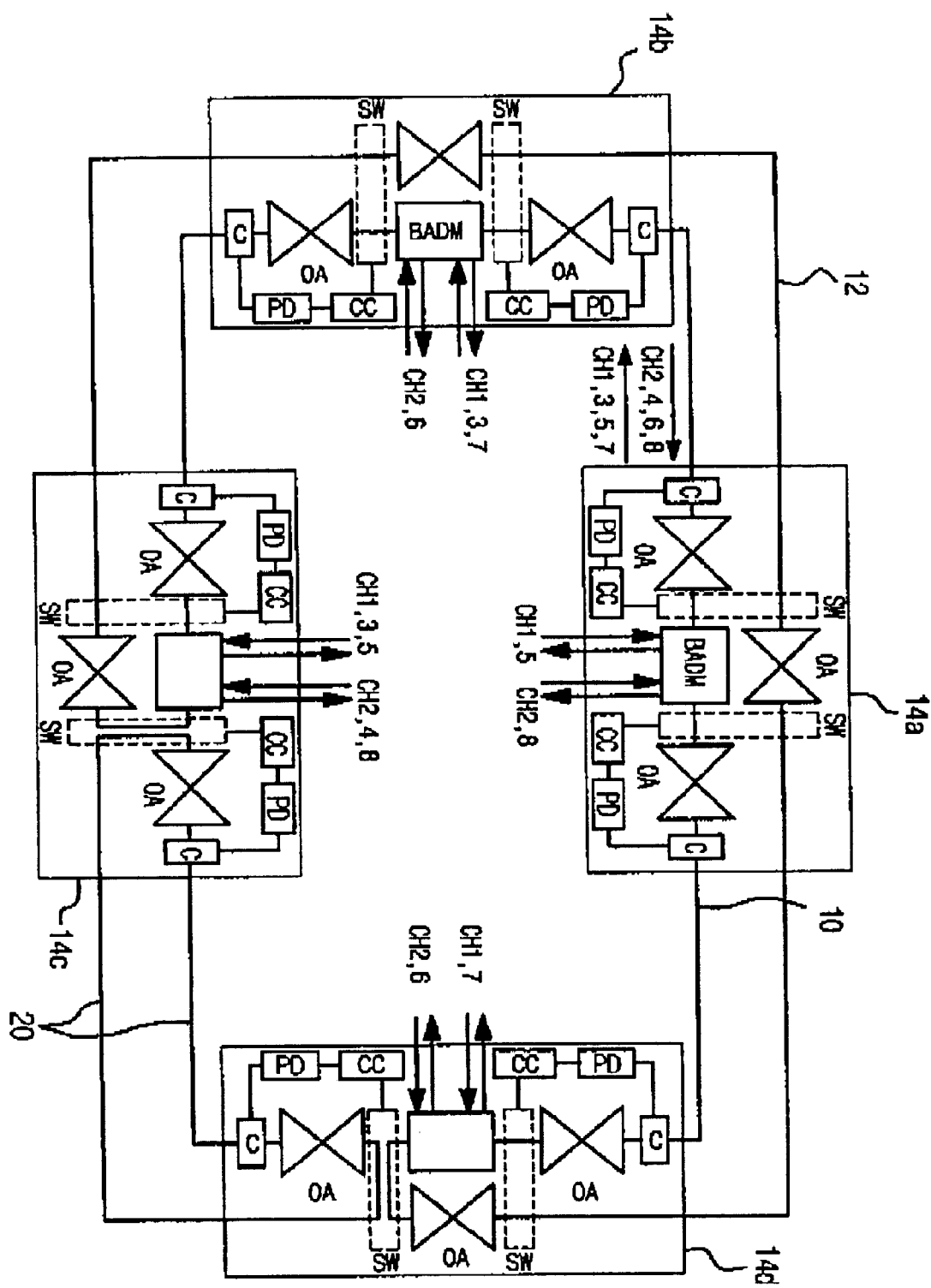
FIG. 10 shows the network forms a closed loop with the recovered fiber sections according to the present invention.

FIG. 10 shows the network immediately after recovery of the failed section. The recovery means the reconnection of the failed working fiber link 10 between the node 3 (14c) and the node 4 (14d).

Even if the failures in the optical links 10, 12 are recovered, the state of the switches (SW) in the nodes 14c, 14d do not change. As a result, a closed loop is formed with the switches (SW) in the nodes 14c and 14d, the working fiber link 10, and the protection fiber link 12. There are also two optical amplifiers (OA) in the closed loop. They are originally used to compensate signal loss by Bi-directional Add/Drop Multiplexers (BADM), switches (SW), and working fiber links 10.

When a failure occurs in the working fiber link 10, no signals enter the optical amplifier (OA). However, the optical amplifier (OA) is operated under the same pump condition prior to the occurrence of the failure.

If the loop gain of the closed loop 20 is larger than 1, then some of the wavelength of Amplified Spontaneous Emission (ASE) noise generated in the optical amplifiers (OA) obtain a significant gain and a lasing begins. The couplers (C) and the photodetectors (PD) detect the optical power into the nodes.

If the optical power exceeds a threshold, the control circuit (CC) returns the state of the switch (SW) to the original condition.

Hence, it is important to set the gain of the optical amplifier (OA), so that the loop gain of the closed loop 20 exceeds 1.

Figure 11:
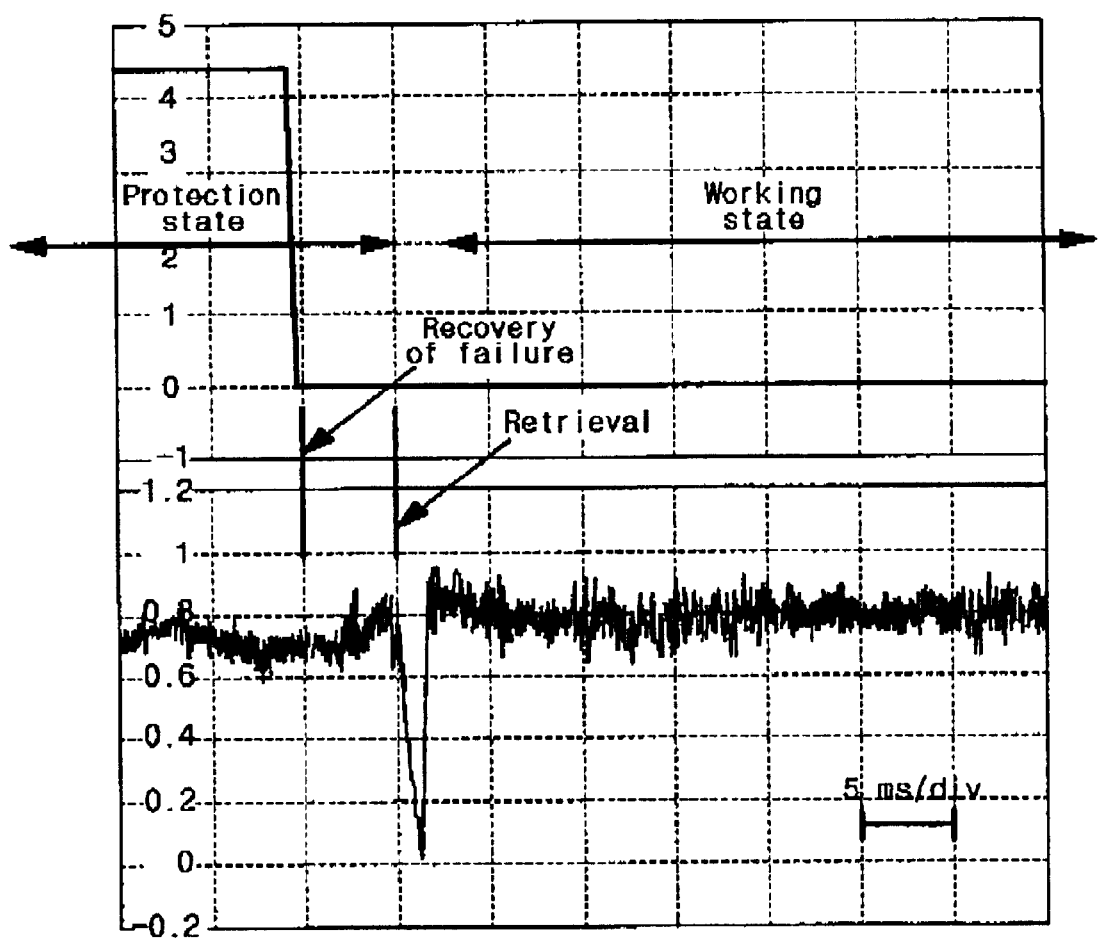
FIG. 11 shows a retrieval characteristic of the network according to the present invention after the recovery of the failed fiber section.

FIG. 11 shows a retrieval process according to the present invention. The upper trace shows the state of the switch (SW) in the node 3 (14c) and the lower trace shows the optical power into the node 3 (14c).

The "HIGH" state of the upper trace shows that the network is in the protection state and the "LOW" state shows that the failure is recovered. About 5 ms after the recovery of the failure, the transition occurs in the lower trace.

Even if the recovery process is completed, the switch (SW) maintains its state until completion of the retrieval process. Thus the transition period is relatively short compared with that of the restoration process shown in FIG. 7.

FIG. 12 shows that the present invention can be used for four-fiber bi-directional WDM self-healing ring networks. The network forms two closed loops with the working fiber links 10 and the protection fiber links 12 immediately after the recovery of the failure.

In FIG. 10, the upstream and the downstream signals are transmitted through only one optical fiber. In FIG. 12, however, the upstream and the downstream signals are transmitted through different fibers. One fiber is used for the unidirectional transmission, and a pair of fibers can accomplish the bi-directional transmission.

Accordingly, in FIG. 12, two working fiber links 10 and two protection fiber links 12 are needed between two adjacent nodes (i.e., 14c and 14d). The number of required switch is also doubled compared with the case of a two-fiber bi-directional WDM self-healing ring network.

FIG. 13 shows that the present invention can be used to a two-fiber unidirectional WDM ring network. In this case, additional optical couplers (C) and control circuits (CC) are needed in the protection fiber links 12. These additional components are used for the retrieval process.

After the recovery of the failure, a closed loop is formed with the working fiber link 10 and the protection fiber link 12 between two adjacent nodes. The tap couplers in the working fiber link 10 and the protection fiber link 12 detect the optical power into the nodes. When the loop gain exceeds 1, the control circuit returns the state of the switches (SW) to the original state.

FIG. 14 shows that the present invention can be used for a Multiplex Section Shared self-healing ring network. The Multiplex Section Shared self-healing ring transmits the signals with higher priority along the working fiber link 10 and the signals with lower priority along the protection fiber link 12 in the normal state. However, if a failure occurs in the optical fiber link 10 and 12, the signals with lower priority are not transmitted by control of the switch box (SWB).

As described so far, a Multiplex Section Shared self-healing network utilizes the optical fibers more efficiently than a Multiplex Section Dedicated self-healing network.

The present invention can perform the automatic restoration and retrieval without changing the network topology. It also can minimize the variation of the network structure. Therefore, it can be used for various ring network topologies.

What is claimed is:

1. An automatic retrieval method of a wavelength division multiplexed ring network to the normal operation state after recovery of a failure comprising;

a detection step where the photodetectors in the nodes detect a failure that occurs during the normal operation state while a plurality of the nodes are in connection with the working fiber links and the protection fiber links, a control step where the control circuit controls the space switches in the nodes adjacent to the failed fiber section, a recovery step where the signals which have been transmitted along the working optical fiber links is detoured along the protection optical fiber links, a closed-loop formation step in which a closed loop is formed with the working optical fiber links and the protection fiber links adjacent to the failed fiber section after recovery of the failure, a lasing step in which a lasing is induced by making the loop gain of the said closed loop exceeds 1, a retrieval step in which if the optical power into the photodetectors in the node exceeds a threshold, the control circuit returns the state of the switches (SW) to the normal state, and finally the network is retrieved from the protection state to the working state.

2. An automatic retrieval method of a wavelength-division multiplexed ring network according to claim 1 wherein said recovery step comprises an optical amplifier, which maintain the same pump condition prior to the occurrence of the failure.

3. An automatic retrieval method of a wavelength-division multiplexed ring network according to claim 1 wherein said lasing step in which the gain of the optical amplifiers compensates the loss of the closed loop and the loop gain of the closed loop is larger than 1.

4. An automatic retrieval method to the normal operation state after recovery of a failure for a two-fiber bi-directional wavelength-division multiplexed self-healing ring network that comprises;
- a detection step where the photodetectors in the nodes detect a failure that occurs during the normal operation state while a plurality of the nodes are in connection with the working fiber links and the protection fiber links,
- a control step where the control circuit controls the space switches in the nodes adjacent to the failed fiber section,
- a recovery step where the signals which have been transmitted along the working optical fiber links is detoured along the protection optical fiber links,
- a closed-loop formation step in which a closed loop is formed with the working optical fiber links and the protection fiber links adjacent to the failed fiber section after recovery of the failure,
- a lasing step in which a lasing is induced by making the loop gain of the said closed loop exceeds 1,
- a retrieval step where the control circuit returns the state of the switches (SW) to the normal state and the network is retrieved from the protection state to the working state if the optical power into the photodetectors in the node exceeds a threshold,
- wherein said closed loop is formed of the working fiber links, the protection fiber links, the amplifiers, and the space switches have been used for the restoration of the failure.

5. An automatic retrieval method to the normal operation state after recovery of a failure for a four-fiber bi-directional wavelength-division multiplexed self-healing ring network that comprises;
- a detection step where the photodetectors in the nodes detect a failure that occurs during the normal operation state while a plurality of the nodes are in connection with the working fiber links and the protection fiber links,
- a control step where the control circuit controls the space switches in the nodes adjacent to the failed fiber section,
- a recovery step where the signals which have been transmitted along the working optical fiber links is detoured along the protection optical fiber links,
- a closed-loop formation step in which a closed loop is formed with the working optical fiber links and the protection fiber links adjacent to the failed fiber section after recovery of the failure,
- a lasing step in which a lasing is induced by making the loop gain of the said closed loop exceeds 1,
- a retrieval step where the control circuit returns the state of the switches (SW) to the normal state and the network is retrieved from the protection state to the working state if the optical power into the photodetectors in the node exceeds a threshold,
- wherein said closed loops are formed of the working fiber links, the protection fiber links, the amplifiers, and the space switches have been used for the restoration of the failure.

6. An automatic retrieval method to the normal operation state after recovery of a failure for a two-fiber unidirectional wavelength-division multiplexed self-healing ring network that comprises;
- a detection step where the photodetectors in the nodes detect a failure that occurs during the normal operation state while a plurality of the nodes are in connection with the working fiber links and the protection fiber links,
- a control step where the control circuit controls the space switches in the nodes adjacent to the failed fiber section,
- a recovery step where the signals which have been transmitted along the working optical fiber links is detoured along the protection optical fiber links,
- a closed-loop formation step in which a closed loop is formed with the working optical fiber links and the protection fiber links adjacent to the failed fiber section after recovery of the failure,
- a lasing step in which a lasing is induced by making the loop gain of the said closed loop exceeds 1,
- a retrieval step where the control circuit returns the state of the switches (SW) to the normal state and the network is retrieved from the protection state to the working state if the optical power into the photodetectors in the node exceeds a threshold,
- wherein said closed loop is formed of the working fiber links, the protection fiber links, the amplifiers, and the space switches have been used for the restoration of the failure.

7. An automatic retrieval method to the normal operation state after recovery of a failure for a Multiplex Section Shared wavelength-division multiplexed self-healing ring network that comprises;
- a detection step where the photodetectors in the nodes detect a failure that occurs during the normal operation state while a plurality of the nodes are in connection with the working fiber links and the protection fiber links,
- a control step where the control circuit controls the space switches in the nodes adjacent to the failed fiber section,
- a recovery step where the signals which have been transmitted along the working optical fiber links is detoured along the protection optical fiber links,
- a closed-loop formation step in which a closed loop is formed with the working optical fiber links and the protection fiber links adjacent to the failed fiber section after recovery of the failure,
- a lasing step in which a lasing is induced by making the loop gain of the said closed loop exceeds 1,
- a retrieval step where the control circuit returns the state of the switches (SW) to the normal state and the network is retrieved from the protection state to the working state if the optical power into the photodetectors in the node exceeds a threshold,
- wherein said closed loop is formed of the working fiber links, the protection fiber links, the amplifiers, and the space switches have been used for the restoration of the failure.

8. An automatic retrieval method of a wavelength-division multiplexed ring network according to claim 7 wherein said signals transmitted through the protection fiber links in the normal state are not transmitted if a failure occurs in said fiber links and the signals transmitted through the working fiber links are detoured to the protection fiber links due to the change of the switch state in the node adjacent to the failed section.

* * * * *